United States Patent
Agarwal et al.

(10) Patent No.: US 11,726,858 B2
(45) Date of Patent: Aug. 15, 2023

(54) SYSTEM AND METHODS TO DETECT FAULTY COMPONENTS DURING SESSION LAUNCH

(71) Applicant: Citrix Systems, Inc., Ft. Lauderdale, FL (US)

(72) Inventors: Himanshu Agarwal, Bangalore (IN); Vikramjeet Singh Sandhu, Bangalore (IN); Mukesh Garg, Bangalore (IN); Kenneth Bell, Oswestry (GB); Leo C. Singleton, IV, Fort Lauderdale, FL (US); Balasubramanian Swaminathan, Parkland, FL (US); Vivek Koni Raghuveer, Bangalore (IN); Aditya Ranjan, Fort Lauderdale, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/580,113

(22) Filed: Jan. 20, 2022

(65) Prior Publication Data

US 2023/0229547 A1 Jul. 20, 2023

(51) Int. Cl.
*G06F 11/07* (2006.01)
*H04L 9/40* (2022.01)
(Continued)

(52) U.S. Cl.
CPC ........ *G06F 11/079* (2013.01); *G06F 11/0751* (2013.01); *G06F 11/0793* (2013.01);
(Continued)

(58) Field of Classification Search
CPC ...... G06F 11/079; G06F 11/07; G06F 11/302; H04L 41/06; H04L 41/0631
See application file for complete search history.

(56) References Cited

U.S. PATENT DOCUMENTS 6,473,794 B1 10/2002 Guheen et al.
6,513,155 B1 1/2003 Alexander, III et al.
(Continued)

FOREIGN PATENT DOCUMENTS

CN 108900366 A 11/2018

OTHER PUBLICATIONS

Monitor: Application probing, Citrix Product Documentation, Jan. 29, 2020, hllps://docs.citrix.com/en-us/citrixvirtual-apps-desktops-service/monitor/lroubleshoot-deployments/applications/app-probing.html.

*Primary Examiner* — Yolanda L Wilson

(57) ABSTRACT

A computer system configured to identify errors in a session launch initiated by a client application is provided. The computer system includes a memory and at least one processor coupled to the memory. The at least one processor is configured to receive one or more events from one or more applications or devices involved in the session launch, wherein an event of the one or more events comprises information from an application or device call (e.g., an application programming interface (API) call) communicated during the session launch, the information comprising destination information; build a primary Directed Acyclic Graph (DAG) based on the information from the API call; determine an error identifier based on the primary DAG; retrieve a troubleshooting recommendation from a library based on the error identifier; and send the troubleshooting recommendation to the client application.

20 Claims, 11 Drawing Sheets

(51) Int. Cl.
*H04L 41/06* (2022.01)
*H04L 41/0631* (2022.01)

(52) U.S. Cl.
CPC .......... *H04L 41/06* (2013.01); *H04L 41/0631* (2013.01); *H04L 63/0846* (2013.01)

(56) References Cited

U.S. PATENT DOCUMENTS

| | | | |
|---|---|---|---|
| 6,904,594 | B1 | 6/2005 | Berry et al. |
| 7,734,775 | B2 | 6/2010 | Barnett et al. |
| 8,842,578 | B1 | 9/2014 | Zisapel et al. |
| 9,751,303 | B2 | 9/2017 | Sano |
| 10,237,283 | B2 | 3/2019 | Zhang et al. |
| 10,706,028 | B2 | 7/2020 | Baradaran et al. |
| 10,924,590 | B1 | 2/2021 | Zhang et al. |
| 11,516,070 | B1 * | 11/2022 | Shemer ............... H04L 41/5025 |
| 2011/0276396 | A1 | 11/2011 | Rathod |
| 2014/0283080 | A1 | 9/2014 | Beskrovny et al. |
| 2015/0280968 | A1 * | 10/2015 | Gates ................... G06F 11/0769 714/37 |
| 2015/0347751 | A1 | 12/2015 | Card et al. |
| 2017/0102933 | A1 | 4/2017 | Vora et al. |
| 2017/0168914 | A1 | 6/2017 | Altman et al. |
| 2017/0220672 | A1 | 8/2017 | Sainani et al. |
| 2017/0286253 | A1 * | 10/2017 | Che ..................... G06F 11/3636 |
| 2017/0316337 | A1 | 11/2017 | Ganapathi |
| 2018/0041521 | A1 | 2/2018 | Zhang et al. |
| 2018/0046928 | A1 | 2/2018 | Jang et al. |
| 2018/0048661 | A1 | 2/2018 | Bird et al. |
| 2018/0048662 | A1 | 2/2018 | Jang et al. |
| 2018/0276256 | A1 | 9/2018 | Sarkar et al. |
| 2020/0374113 | A1 * | 11/2020 | Noam ..................... G06F 21/64 |
| 2021/0117232 | A1 | 4/2021 | Sriharsha et al. |
| 2021/0117425 | A1 * | 4/2021 | Rao ..................... H04L 67/1031 |
| 2022/0052933 | A1 * | 2/2022 | Bhatnagar ............. H04L 47/826 |
| 2022/0172067 | A1 * | 6/2022 | Kang ................... G06F 11/302 |

* cited by examiner

SYSTEM AND METHODS TO DETECT FAULTY COMPONENTS DURING SESSION LAUNCH

BACKGROUND

A virtual computing service enables users to access virtual applications and desktops executing on hardware located within, for example, a secure datacenter. A user can, for example, access these resources through a local computing device located at a corporate or remote location using a client application configured to interoperate with the virtual computing service.

Given the scale and complexity of a virtual computing service, a wide variety of faults can arise during launch of a virtual computing session. Some of these faults can prevent a user from accessing the resources provided by the virtual computing session.

SUMMARY

In at least one example, a client computer system configured to identify errors in a session launch initiated by a client application is provided. The client computer system includes a memory and at least one processor coupled to the memory. The at least one processor may be configured to receive one or more events from one or more applications or devices involved in the session launch, wherein an event of the one or more events comprises information from an application or device call communicated during the session launch, the information specifying at least a destination application or device. The at least one processor may be further configured to build a primary Directed Acyclic Graph (DAG) based on the information from the application or device call. The at least one processor may be further configured to determine an error identifier based on the primary DAG. The at least one processor may be further configured to retrieve a troubleshooting recommendation from a library based on the error identifier. The at least one processor may be further configured to send the troubleshooting recommendation to the client application.

At least some examples of the client computer system can include one or more of the following features. In the system, the client application can execute under a first tenant context of a plurality of tenant contexts. To receive the one or more events may comprise to send an authentication token to the client application, to receive a request comprising the one or more events and the authentication token from the client application, and to establish authenticity of the request based on the authentication token.

In the system, the authentication token may be valid for a limited time interval. The authentication token may further specify the first tenant context.

In the system, the application or device call may comprise an application programming interface (API) call.

In the system, the event may further comprise a timestamp of the application or device call, an event identifier, and a result code. To build the primary DAG may further be based on the timestamp of the application or device call.

In the system, the primary DAG may comprise a node representing the event.

In the system, to build the primary DAG may comprise to assign an edge from the node directed toward a second node based on the destination application or device. The destination application or device may be associated with the second node.

In the system, to determine the error identifier may further comprise to identify an earliest terminating error based on a traversal of the primary DAG.

In the system, to identify the earliest terminating error may comprise to identify an earliest node of the primary DAG associated with an error.

In the system, the session launch may be triggered by a first operation of the client application. The at least one processor may further be configured to build a secondary DAG for a second operation of the client application. The second operation is asynchronous to the first operation.

In the system, to determine the error identifier may comprise to consume, via an event processing routine, one or more transactions associated with a tenant context. To determine the error identifier may further comprise to determine that an application configuration, a device configuration, or an operation has impacted the session launch.

In the system, to consume the one or more transactions may further comprise to correlate events corresponding to a respective transaction based on one or more of: a respective transaction identifier; a respective session key; or a respective resource identifier.

In at least one example, a method of identifying errors in a session launch initiated by a client application is provided. The method includes acts of receiving, by a server, one or more events from one or more applications or devices involved in the session launch, wherein an event of the one or more events comprises information from an application or device call communicated during the session launch, the information specifying at least a destination application or device. The method may further comprise building a primary Directed Acyclic Graph (DAG) based on the information from the application or device call. The method may further comprise determining an error identifier based on the primary DAG. The method may further comprise retrieving a troubleshooting recommendation from a library based on the error identifier. The method may further comprise sending the troubleshooting recommendation to the client application.

At least some examples are directed to a non-transitory computer readable medium storing executable instructions to identify errors in a session launch initiated by a client application. In these examples, the instructions can be encoded to execute any of the acts of the method of identifying tenant session launch errors described above.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
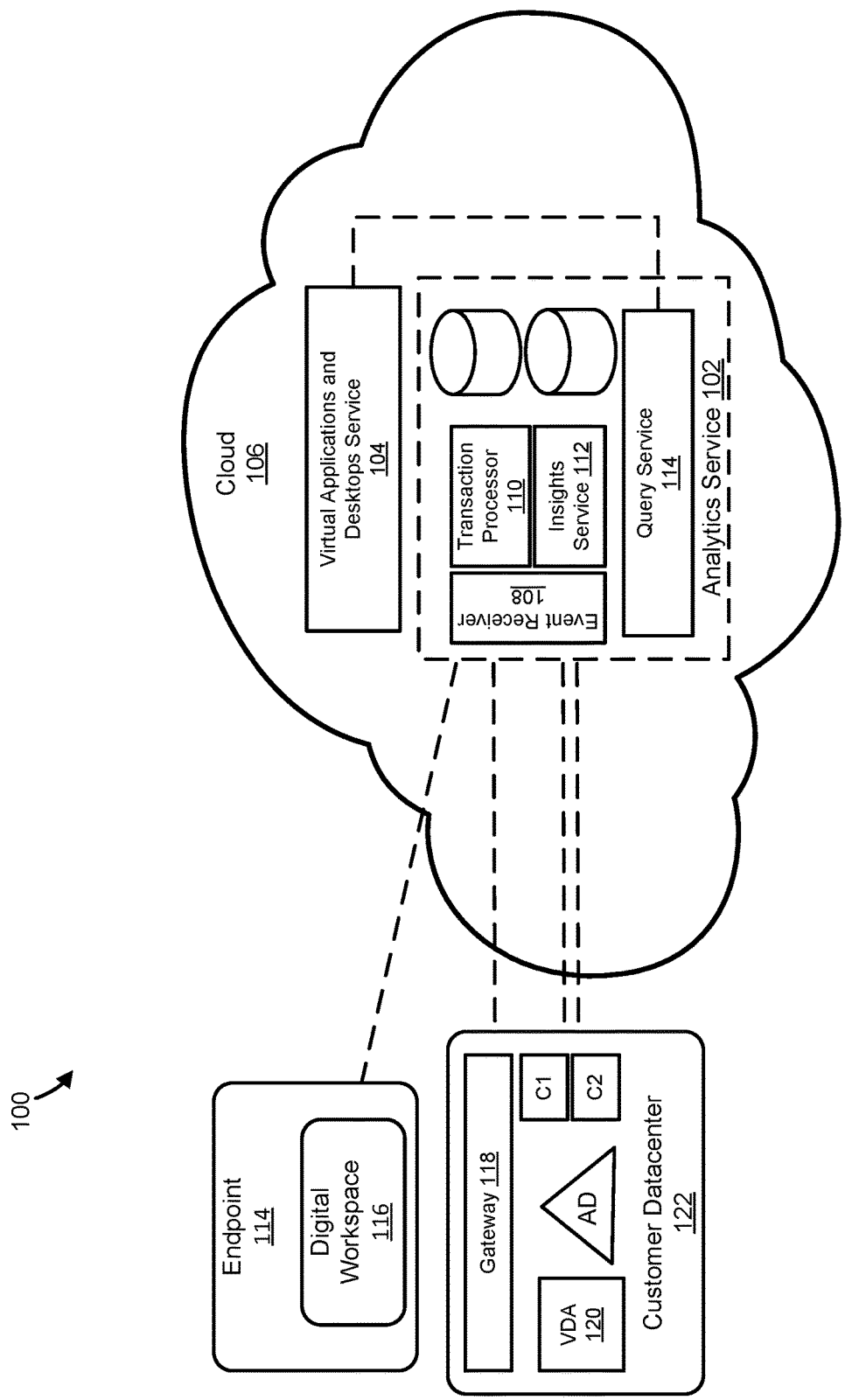
FIG. 1 is a block diagram of an example analytics service for identifying errors in a session launch within a virtual applications and desktops service, in accordance with an example of the present disclosure.

As summarized above, various examples described herein are directed to systems and methods to identify errors in a session launch of a virtual computing service initiated by a client application. The disclosed systems and methods can receive events from components involved in the session launch, such as applications or devices, and build a directed acyclic graph (DAG) based on call information included in the events. The disclosed systems and methods can then traverse the DAG and locate an error based on the traversal and can provide an error description and troubleshooting suggestions to an administrator or user. Accordingly, the disclosed systems and methods can improve the efficiency and effectiveness of troubleshooting in virtual computing services.

A virtual computing service, such as the Citrix Virtual Applications and Desktops Service (CVADS), enables users to access virtual applications and desktops executing on hardware located within, for example, a secure datacenter. A user can, for example, access these resources through a local computing device (e.g., located at a corporate or remote location) using a client application configured to interoperate with the virtual computing service.

Given the scale and complexity of such a virtual computing service, a wide variety of faults can arise during launch of a virtual computing session. Some of these faults can prevent a user from accessing the resources provided by the virtual computing session. As such, it is important for administrators of the virtual computing service to maintain sufficient visibility over faults that arise during session launch, so that the administrators can identify and remediate the faults to keep users of the virtual computing service productive.

An administrator may rely on multiple tools and traces from various components (e.g., applications or devices) in a session launch sequence to identify faulty components. For example, tracing and logging systems can obtain details pertaining to the virtual computing session's operation and/or to session launches, such as traces and telemetry data from the various components. Such data can include information about the components' normal operation, as well as error information, such as thrown exceptions, error codes, and error messages. Such tracing and logging can generate a large volume of data for administrators and support personnel to interpret when attempting to resolve an error.

However, in some cases there may be inadequate tracing on the components or insufficient verbosity for troubleshooting a launch failure. A multitenant distributed architecture serves several tenants (customers) concurrently, however some trace systems cannot distinguish and isolate data from different tenants. Moreover, while an administrator may rely on the virtual computing service's product support to triage the traces and telemetry data, this can consume time, and may face challenges reproducing the problem in view of diverse configurations and network conditions. Likewise, it may be challenging to isolate a specific trace in a dense production environment with, e.g., several thousand active users. For example, an administrator may be aware that an error is present but may receive an overwhelming number of errors in the logging information, making it difficult to discern an actionable event, such as a root cause. In addition, some tracing systems simply facilitate generic infrastructure for writing telemetry but cannot establish the launch sequence and identify specific events that contributed to the transaction failure. Finally, some tracing systems may provide basic parsing (e.g., via regular expressions) to filter specific errors but cannot relate such error information with product support documentation or provide recommendations to fix an issue.

The disclosed system and methods help to address such issues by implementing a specific event trace that outlines a virtual applications and desktops service session launch transaction in a distributed environment, where the components may not be confined in a demilitarized zone (DMZ), but rather may be spread across multiple geographic locations. In addition, the disclosed system and methods enable customers to register and onboard specific components and services in a session launch sequence, so as to enable telemetry. Moreover, the disclosed services and infrastructure can understand a respective tenant context within a multitenant architecture, helping provide data isolation and control. The disclosed infrastructure and mechanisms additionally enable administrators and product support teams to view, share, or download specific launch traces, and a specific routine can analyze the data and provide insights about the point of failure in a session launch sequence. Accordingly, the disclosed system and methods can analyze failures and determine specific events that caused a transaction failure, identify the components involved, and correlate this information with product support documentation to provide relevant instructions to solve the issue.

FIG. 1 is a block diagram of an example analytics service 102 for identifying errors in a session launch within a virtual applications and desktops service 104, in accordance with an example of the present disclosure. This diagram depicts typical components and services 100 that help end users connect to virtual resources. For example, a cloud service 106 (such as Citrix Cloud and/or the digital workspace server 902 of the example of FIG. 9 below) may provide a virtual applications and desktops service 104, such as CVADS, enabling customers to build, manage, and monitor virtual infrastructure. An organization, such as a customer organization, may subscribe to the virtual applications and desktops service 104 to set up a virtual desktop infrastructure (VDI) environment. Using the virtual applications and desktops service 104 and the VDI, end users may access data and applications from any location or device via a workspace application, for example the digital workspace 116 executing at the client endpoint 114.

Figure 2A:
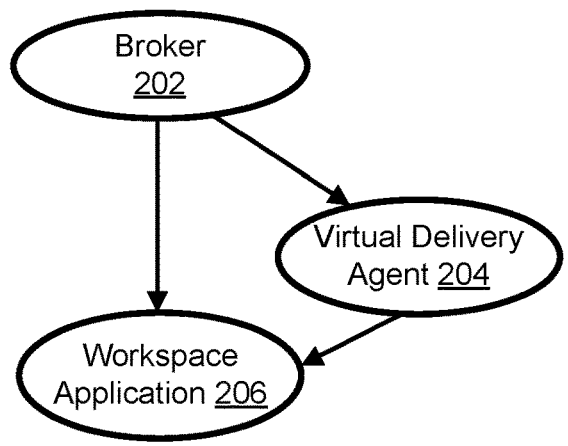
FIG. 2A illustrates an example primary directed acyclic graph (DAG) of a session launch process, in accordance with an example of the present disclosure.

When an end user signs into the digital workspace 116 or requests a resource, the virtual applications and desktops service 104 may initiate a session launch sequence to provide user access to an application or desktop. The ensuing session launch sequence may include a complex series of calls among various components of the customer datacenter 122, client endpoint 114, cloud service 106, and/or workspace server. For example, components, such as applications and/or devices, may make application programming interface (API) calls to other components. For example, a broker service may make an API call to power on a virtual delivery agent (VDA) 120 in the customer datacenter 122, as shown in FIG. 2A below. In such complex and interdependent session launch sequences, there may be numerous occasions for error or factors which could cause the session launch and/or user access to fail.

To mitigate such issues, the disclosed cloud service 106 can also host an analytics service 102, such as Citrix Analytics Service (CAS), which can enable administrators or support personnel to monitor the entire VDI stack. The analytics service 102 allows customers to onboard different services and components in the virtual environment to share telemetry, and processes this data for specific use cases. The disclosed analytics service 102 can also include an event receiver 108, which can receive events from the components, a transaction processor 110, which can batch the events belonging to a respective transaction, and an insight service 112.

The insight service 112 can process the events to determine whether a session launch transaction failed, which operation or action in the session launch sequence failed, and/or which component caused the failure. The insight service 112 can store these insights for each transaction in an insights store. A particular transaction may include one or more failure events, and in cases like these, it is important for the insight service 112 to analyze these events and determine which one may have caused a failure and provide relevant support information to address the issue. In order to locate such terminating errors, the insight service may build and traverse a DAG representing the session launch sequence, as illustrated in FIGS. 2A and 2B, 4, 6, and 7 below. The analytics service 102 can also provide a query service 114 that can subsequently look up an error identifier associated with a located error, and can provide troubleshooting analysis, visualizations, and recommendations, aiding real-time forensic investigations or historical analysis, as described in the examples of FIGS. 8A and 8B below.

The systems and processes to identify errors in a session launch described herein can be implemented within a variety of computing resources. For instance, in some examples, some components of the disclosed error identification systems and processes are implemented within a browser and/or a browser extension. Moreover, in some examples, components of the disclosed systems and processes are implemented within a virtualization infrastructure, such as the HDX™ virtualization infrastructure commercially available from Citrix Systems of Fort Lauderdale, Fla., in the United States. In these examples, components of the disclosed error identification systems and processes can be implemented within a workspace client application (also referred to as a digital workspace application), such as the Citrix Workspace™ application; a browser embedded within the workspace client application; a secure browser service, such as the Citrix Secure Browser™ service; a gateway appliance, such as the Citrix Application Delivery Controller™ (ADC); a virtualization agent, and/or other computing resources.

FIG. 2A illustrates an example primary DAG 200 of a session launch process, in accordance with an example of the present disclosure. A session launch sequence can include a number of steps that may occur synchronously or asynchronously to optimize the overall experience. For example, the session launch sequence may include a complex series of calls among various components of the customer datacenter (e.g., customer datacenter 122 of FIG. 1), client endpoint, cloud service, and/or workspace server, such as application programming interface (API) calls among applications and/or devices. A session launch DAG, such as the DAG 200, may illustrate the calling sequence among these components. Such a DAG may be unidirectional, such that each edge may be traversed only in the direction pointing from the origin node to the destination node, and may be acyclic, such that no directed path leads from any node back to the same node.

A faulting step may be a step in the session launch sequence that prevents the sequence from proceeding. The disclosed system and methods can be used to facilitate identifying such an error during the system launch, for example to determine which component is faulty. By building a DAG, the disclosed system and methods may greatly reduce ambiguity in pinpointing such an error. Because a DAG is unidirectional and acyclic, a session launch DAG, such as the DAG 200, may make it significantly likely that the first terminating error can be found, as disclosed herein below.

In an example launch sequence illustrated in the DAG 200, a broker service 202 (such as the broker 924 discussed in FIG. 9 below) may power on a VDA 204. The broker 202 may also start a virtualized workspace application 206. The workspace application 206 may also be called by the VDA 204, or may receive information from the VDA 204. Building a DAG representing the session launch is described in greater detail in the example of FIG. 6 below.

Figure 2B:
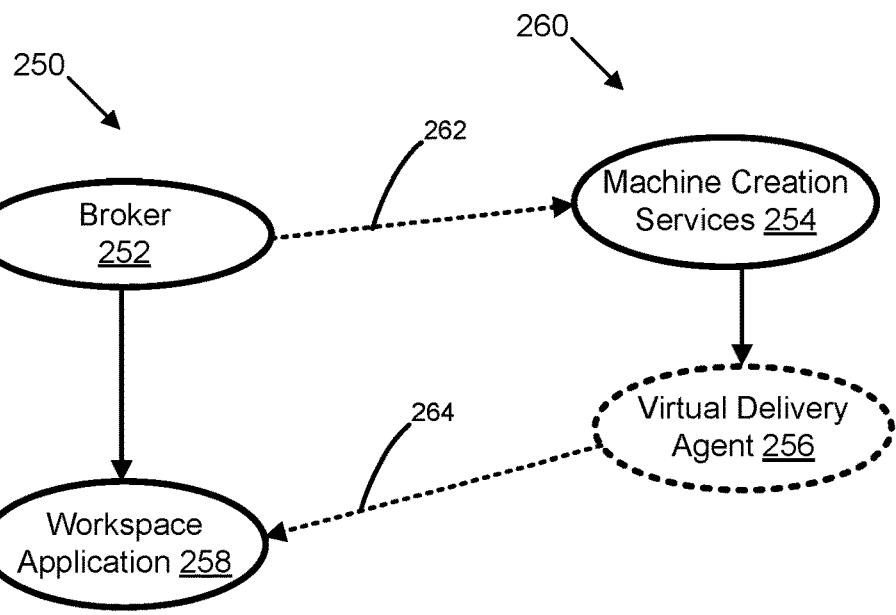
FIG. 2B illustrates example primary and secondary DAGs of a session launch process, in accordance with an example of the present disclosure.

FIG. 2B illustrates an example primary DAG 250 and secondary DAG 260 of a session launch process, in accordance with an example of the present disclosure. A DAG that includes the first operation of the client application or tenant that triggers the session launch may be considered a primary DAG representing the session launch sequence. For example, the DAG 200 of FIG. 2A and the DAG 250 of FIG. 2B illustrate primary DAGs. In some examples, the system may also build a secondary DAG, such as the DAG 260, for each asynchronous operation of the client application or tenant.

In this example, a session launch may require the broker service 252 to trigger a power-on operation of a VDA 256. However, the broker 252 may not wait for the power operation to complete, and shares the VDA information asynchronously with the workspace application 258. While establishing the connection with the VDA 256, the workspace application 258 might fail because, due to an unidentified failure in the power-on sequence, the power-on operation on the VDA 256 is not completed successfully. In this case, traversing the primary DAG 250 would clarify the need to traverse a secondary DAG 260 for the power-on sequence in the VDA 256.

For example, the secondary DAG 260 illustrates that the machine creation services (MCS) 254 must initiate the VDA 256. In this example, the secondary DAG 260 has a missing node corresponding to the VDA 256. For example, the node 256 may be missing because the VDA was unable to send an event, due to the occurrence of the terminating error. In such a case, if no nodes prior to the MCS 254 are associated with the same error (e.g., based on an error identifier), or with any error, then when searching for the first terminating error, the system may identify the first terminating error as the MCS 254. Accordingly, by checking any failures from the MCS service 254, the system may pinpoint the error more precisely for the administrator. For example, the corresponding error identifier or code may be used to reference a troubleshooting article from the product support catalog, as described in the examples of FIGS. 8A-8B below. Building a DAG with a missing node is described in greater detail in the example of FIG. 6 below.

In some examples, an edge 262 may be directed from the node 252 of the primary DAG 250 that triggers the asynchronous operation to the first node 254 of the secondary DAG 260. Moreover, a subsequent event 258 that requires a previously-triggered asynchronous operation to complete may be considered as an event continuing the primary DAG 250. For example, an edge 264 may be directed from some node of the secondary DAG, such as the last node 256 of the secondary DAG 260, to the node 258 of the primary DAG that is dependent on the asynchronous operation.

Figure 3:
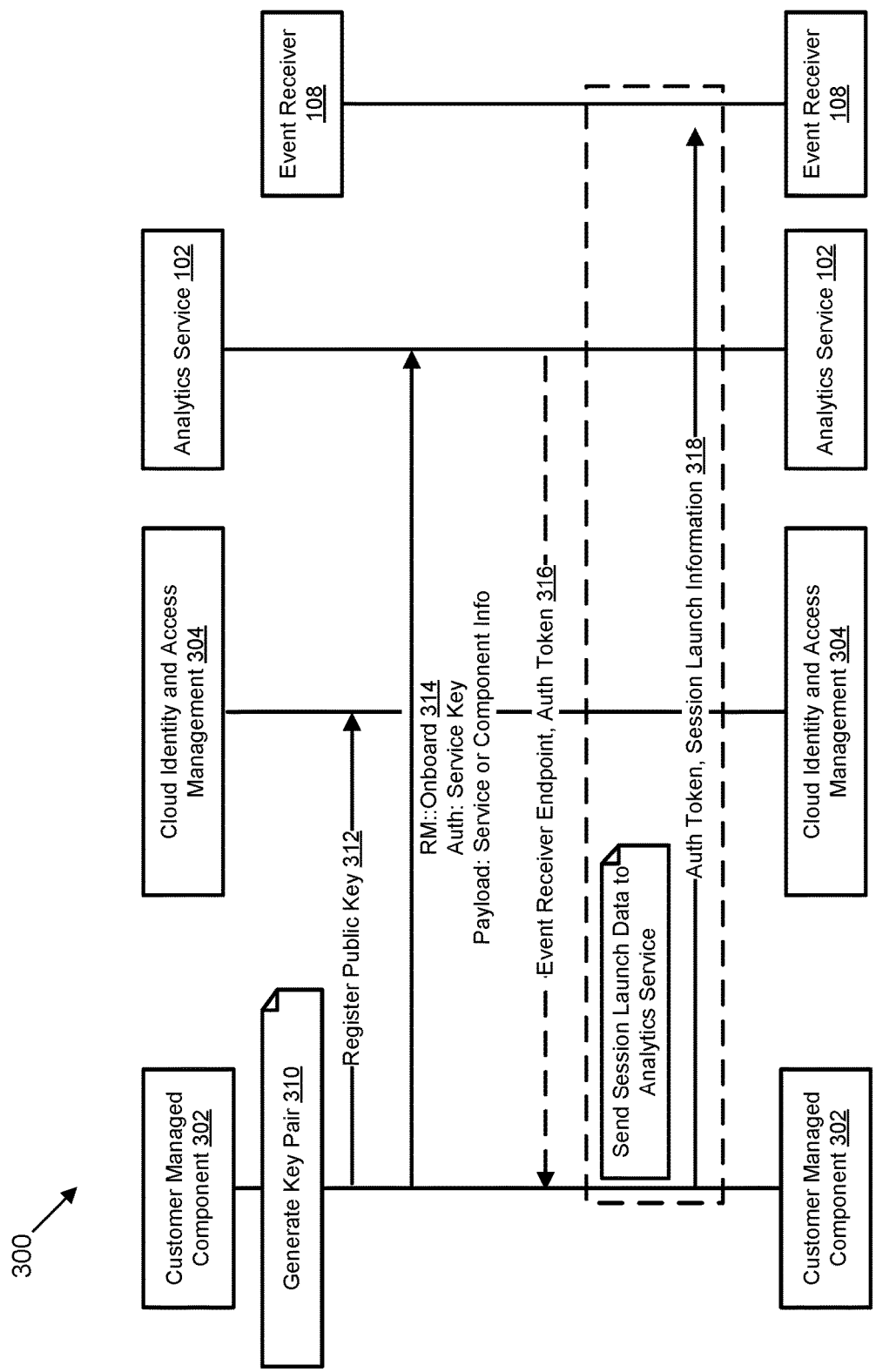
FIG. 3 is a communication flow diagram illustrating a system to identify errors in a session launch, in accordance with an example of the present disclosure.

FIG. 3 is a communication flow diagram illustrating a method 300 to identify errors in a session launch, in accordance with an example of the present disclosure. The steps of the method 300 may be performed by the customer managed component 302 (e.g., a component of the customer datacenter 122 of FIG. 1), cloud identity and access management (IAM) service 304, analytics service 102 (e.g., CAS), and event receiver 108 shown in FIG. 1. In some examples, the method 300 may instead or additionally be performed by one or more centrally-managed components, e.g. at the virtual computing service or virtual applications and desktops service. The event receiver 108 may be hosted by the analytics service 102. Alternatively or additionally, some or all of the steps of the method 300 may be performed by one or more other computing devices. The steps of the method 300 may be modified, omitted, and/or performed in other orders, and/or other steps added.

At step 310, the customer managed component 302 may generate a key pair to be used to onboard the component 302.

At step 312, the customer managed component 302 can register a public key of the generated key pair with the cloud IAM 304. Alternatively or additionally, the customer managed component 302 can use a generated service credential to request details about the event receiver as well as an authentication token (e.g., a token used to authenticate the logging events) from the analytics service 102.

At step 314, the customer managed component 302 can send onboarding information to the analytics service 102. This onboarding information can include a service key for authentication, and service or component information as a payload. In an example using a cloud management platform (for example, Citrix Cloud or another cloud management platform), when the customer managed component 302 has successfully created an onboarded virtual device via a Resource Manager (RM) of a cloud computing service (for example, Microsoft Azure or another cloud computing service), the customer managed component 302 may send 314 a message including the onboarding information.

At step 316, the analytics service 102 can send event receiver endpoint information and an authentication token for logging to the customer managed component 302. In order to provide secure multitenant logging, the authentication token may specify a unique tenant context, and may be valid for a limited time interval. The authentication token can also help the analytics service 102 validate, process, and store events.

The customer managed component 302 can then send session launch data to the analytics service 102. At step 318, the customer managed component 302 can send a request including the authentication token and session launch information to the event receiver 108. The session launch information may include events describing calls (e.g., API calls) communicated among components involved in the session launch process. In response to receiving the request, the event receiver 108 can authenticate the request based on the authentication token, and can process the events, as described in the examples of FIGS. 4, 5, and 6 below.

Figure 4:
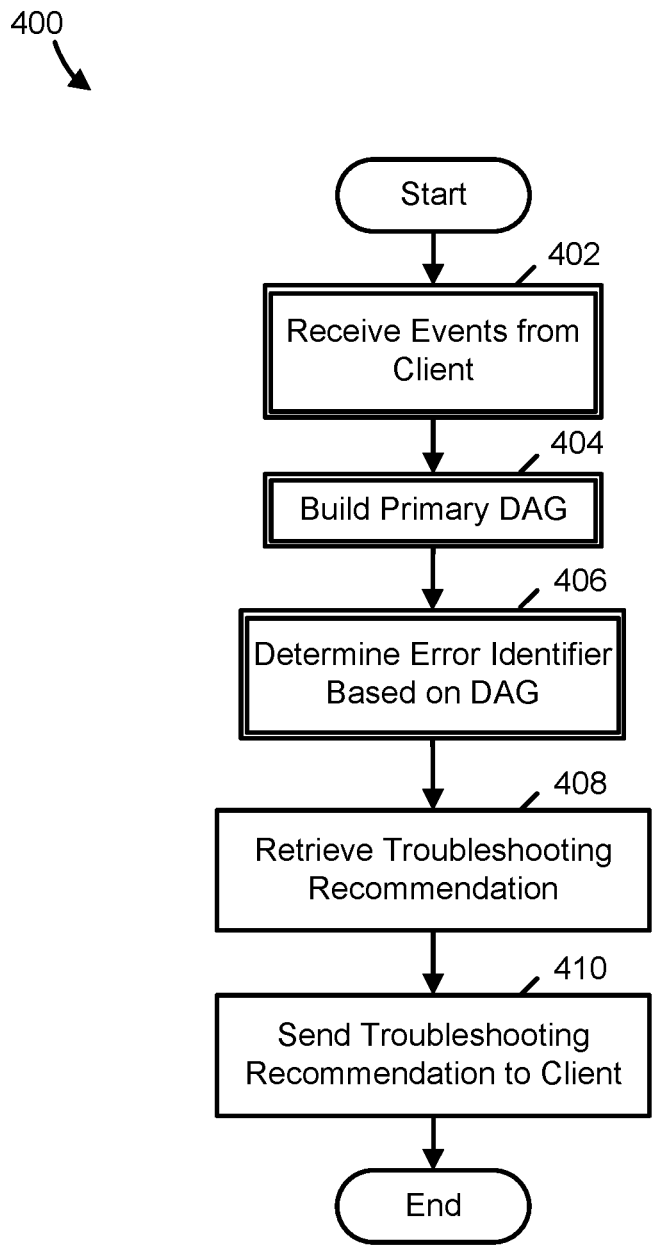
FIG. 4 is a flow diagram of a process for identifying errors in a session launch within a virtual applications and desktops service, in accordance with an example of the present disclosure.

FIG. 4 is a flow diagram of a process 400 for identifying errors in a session launch within a virtual applications and desktops service, in accordance with an example of the present disclosure. In various examples, the process 400 may be implemented by an analytics service, such as the analytics service 102 of the example of FIG. 1 above, and/or by the query service 114, the event receiver 108, the transaction processor 110, and the insights service 112. These services may execute within a cloud service, such as the cloud service 106 in the example of FIG. 1 above, for example they may be executed by a workspace server. Alternatively or additionally, the process 400 may be executed by a client device, or may be implemented within a virtualization infrastructure, as described in the example of FIG. 9 below, and is not limited by the present disclosure. In various examples, the session launch may involve components located at the cloud service or workspace server, a customer datacenter (e.g., customer datacenter 122 of FIG. 1) and/or a client endpoint (e.g., endpoint 114 of FIG. 1).

As shown in FIG. 4, the process to identify errors in a session launch starts with the event receiver and/or the analytics service receiving 402 one or more events from one or more applications or devices involved in the session launch. Each event corresponds to an operation in a session launch sequence and, may include additional metadata about the operation as well.

In an example, the session launch may be triggered by a first operation of the client application. Many components may be involved in enabling session launches of virtual applications and desktops sessions, some components of which may be part of the customer owned or managed resource locations (e.g., the customer datacenter 122 of FIG. 1) and/or the client endpoint (e.g., the endpoint 114 of FIG. 1), and some of which may be part of centrally owned or managed cloud services (e.g., the cloud service 106 and/or CVADS 104 of FIG. 1). As illustrated in the examples of FIGS. 2A-2B, the session launch sequence may include a complex series of calls (for example, API calls) among these various components. In an example, the disclosed system and methods can be used to facilitate identifying an error during the system launch, for example to determine which component is faulty. For example, by building a DAG, the disclosed system and methods can greatly reduce ambiguity in pinpointing such an error.

The components of the customer datacenter, endpoint, and/or cloud can send events describing their calls (e.g., the calling component, the destination component, a timestamp of the call, and the like), and the analytics service can receive 402 the events. In some examples, the events are received by an event receiver (e.g., the event receiver 108 of FIG. 1). For example, each component may emit start and end events for each operation it performs during the session launch sequence and may send these events to the event receiver. Note that these component API calls, and the associated events, may be asynchronous, and may not necessarily have an organized structure. However, because each component call has an unambiguous ordering from the calling component to the called component, in practice the disclosed system and methods can consistently build a DAG. Moreover, when the system is able to build the DAG, it can determine a faulting step or first terminating error in the system launch.

Accordingly, a respective event received 402 by the system may include information from a call (e.g., an API call) communicated during the session launch process. This information may include destination information, which may specify a destination component (e.g., a destination application or device) of the API call. The destination information may also be referred to as payload information. A respective event may further comprise a timestamp of the API call, an event identifier, a result code specifying the outcome of the operation, and/or a transaction identifier (transaction ID). The event may optionally include additional information, such as information about the component involved, information about the component's configuration, additional metadata about the operation, and the like. For example, the events may be transmitted separately, or be combined, in one or more formatted files, messages, or human-readable, structured, or self-describing packets, such as XML, HTML, JavaScript Object Notation (JSON), and the like.

In an example, the virtual applications and desktops service may be a multitenant system, such as CVADS. Accordingly, the analytics service can securely process logging and/or telemetry information from session launches of multiple tenants. For example, the analytics service may send each tenant a unique, time-limited authentication token, which can identify the tenant. In some examples, the analytics service receives a request from the client application that includes the events together with the authentication token, and authenticates the request based on the authentication token. Some examples of receiving events from applications or devices of a respective client application or tenant are described further in FIG. 3 above and in FIG. 5 below.

Next, the insights service and/or analytics service can build 404 a primary DAG based on the information from the API call. For example, the system may build an edge directed from a respective node toward a second node that is associated with the destination component of the API call represented by the respective node. The DAG may be unidirectional, such that each edge may be traversed only in the direction pointing from the origin node to the destination node, and may be acyclic, such that no directed path leads from any node back to the same node.

In some examples, the system may additionally build the primary DAG based on the timestamps of the API calls represented by the events. However, if a conflict occurs between the timestamps and the destination information, the system may assign greater priority to the destination information. For example, if component A calls component B, which in turn calls component C, but the timestamp of component B's call is earlier than the timestamp of component A's call, the system may determine that the timestamp information is erroneous. For example, the system may assign greater priority to the call destination information because some components have strict dependencies on others, so the call destination information may be more integral to the session launch than is the timestamp information.

Some examples of building a primary DAG are described further in FIGS. 2A-2B above, and in FIG. 6 below. As described above, the session launch may be triggered by a first operation of the client application or tenant. In some examples, the system may also build one or more secondary DAGs for additional operations of the client application or tenant, which may be asynchronous to the first operation, as in the example of FIG. 2B. In some examples, the system may also build higher-order DAGs, such as tertiary DAGs, etc.

Next, the insights service and/or analytics service can determine 406 an error identifier based on the DAG. In some examples, successfully building 404 the DAG enables the system to subsequently locate the error, for example by traversing the resulting DAG. For example, the analytics service can traverse the primary DAG and/or any additional DAGs, such as secondary DAGs, in order to identify the first terminating error. In an example, the first terminating error may be an earliest node of the DAG associated with an error. In some examples, the analytics service can determine the error identifier, such as a code identifying the error, by locating the node corresponding to the first terminating error and determining an error identifier from an event associated with the node. In some examples, the system may traverse the DAG in reverse order starting from a node with a terminating error, such as a node associated with a component unable to complete its operation. Some examples of determining an error identifier based on the primary DAG, and/or any other DAGs, are described further in FIG. 7 below.

Next, the query service and/or analytics service can retrieve 408 a troubleshooting recommendation from a library or database based on the error identifier. In some examples, the event processing routine correlates failure information, such as the error identifier, with product support documentation, a library, or a database, in order to provide relevant recommendations to address an issue. For example, the library or database may be stored in a storage local to, or otherwise accessible to, the cloud service, workspace server, and/or analytics service. In an example, the library or database may be indexed to the error identifier as a lookup key for the troubleshooting recommendation. In another example, the system can receive a request from a user or administrator for information based on a transaction ID, as in the example of FIG. 8A below, and can retrieve insights for a transaction based on the transaction ID from an insights store.

In some examples, the troubleshooting recommendation retrieved from the library may include a description of the error, possible causes, and/or recommended actions, as in the example of FIG. 8B below. In some examples, the library or database may be relatively static, for example it may contain a comprehensive store of errors and recommendations, which can then be customized to a particular client or tenant by lookup of the particular error identifier. Alternatively or additionally, the library or database may be updated over time. For example, as new errors are encountered, the library or database may be updated to improve, qualitatively and/or quantitatively, its coverage of the range of possible errors. In another example, the library or database may be updated to incorporate new or improved troubleshooting recommendations, such as new workarounds or solutions found to be more effective or expedient than previous recommendations. In yet another example, the library or database may be updated so as to be kept current, for example by incorporating or addressing changes in the virtual applications and desktops technology, e.g. CVADS.

Next, the query service and/or analytics service can send 410 the troubleshooting recommendation to the client application or tenant. For example, the client application or tenant can render the troubleshooting recommendation to an administrator or other user. For example, the query service and/or analytics service can display error information and/or troubleshooting recommendations via a user interface, or serve such information via a website (e.g., as HTML, cascading style sheets (CSS), and the like), or via a web or software-as-a-service application. Some examples of a user interface within an administrator console for analysis and troubleshooting are described further in FIGS. 8A-8B below. The process 400 may then end.

Figure 5:
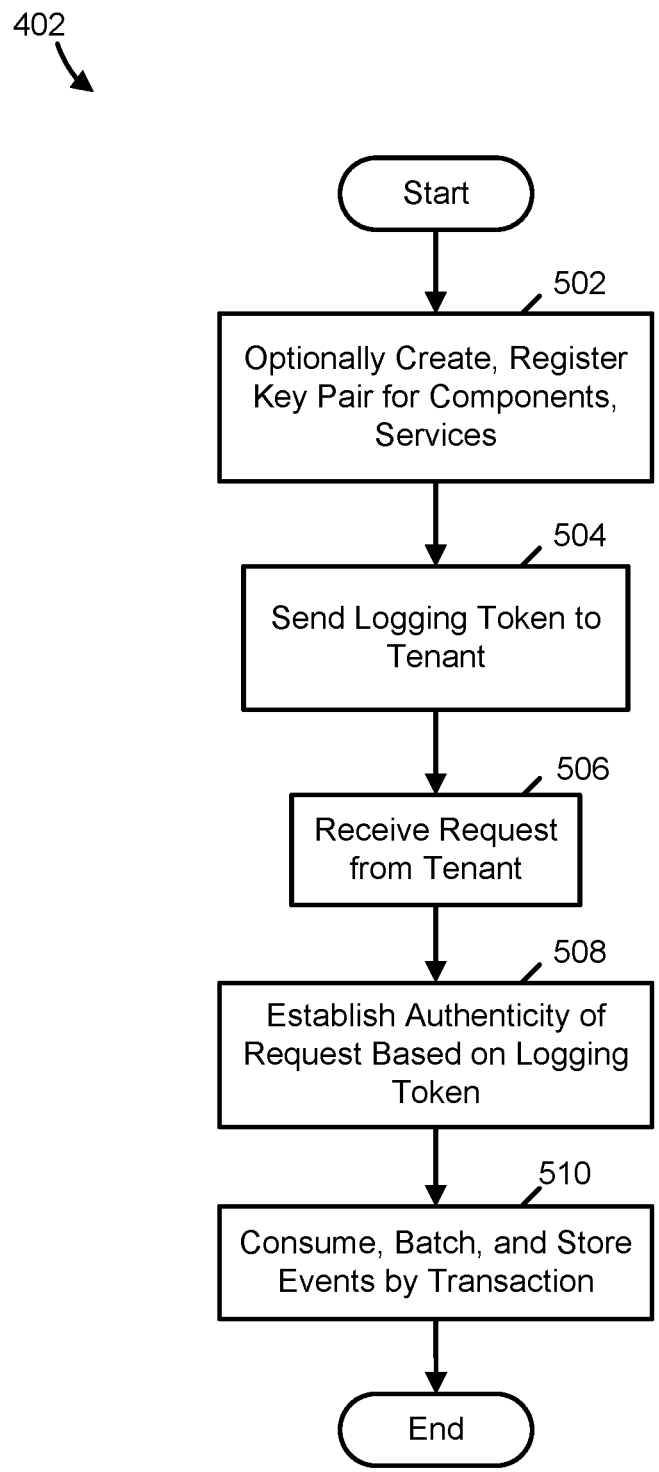
FIG. 5 is a flow diagram of a process for receiving and authenticating a tenant request to identify errors in a session launch, in accordance with an example of the present disclosure.

FIG. 5 is a flow diagram of a process 402 for receiving and authenticating a tenant request to identify errors in a session launch, in accordance with an example of the present disclosure. In this example, the process 402 may provide additional details of step 402 of the process 400 for identifying errors in a session launch in FIG. 4. In various examples, the process 402 may be implemented by an analytics service, such as the analytics service 102 of the example of FIG. 1 above, and/or by the event receiver 108, the transaction processor 110, the insights service 112, or any other services or devices described herein. These services may execute within a cloud service, as in the example of FIG. 1 above, for example they may be executed by a workspace server. Alternatively or additionally, the process 402 may be executed by a client device, or may be implemented within a virtualization infrastructure, as described in the example of FIG. 9 below, and is not limited by the present disclosure.

In some examples, the analytics service allows customers to onboard different services and components in the virtual environment to share telemetry, and the analytics service processes this data for specific use cases. For example, a customer may register components in the session launch sequence to the cloud analytics service, as disclosed herein. In response, the customer's datacenter, tenant, client application, or endpoint can obtain information about the event receiver endpoint to which to send the event data, as well as an authentication token that remains valid for a limited time interval and specifies a tenant context for the events. In another example, a component may onboard itself, for example by communicating with the analytics service.

In some examples, the virtual applications and desktops service may be a multitenant system, such as CVADS. In such a case, each client application executes under a tenant context, and the analytics service may repeat these techniques (e.g., via the process 402 described in this example) for each one of multiple tenant contexts. Accordingly, the analytics service can securely process logging and/or telemetry information from session launches of multiple tenants.

As shown in FIG. 5, the process to receive and authenticate a tenant request to identify errors in a session launch starts with the analytics service optionally creating 502 and/or registering a key pair for a particular tenant's components and services. For example, an administrator can create and register a key pair with a cloud service, such as Citrix Cloud and/or the digital workspace server 902 of the example of FIG. 9 below, or can use a generated service credential to request the details about the event receiver as well as the authentication token from the analytics service. For example, a CVADS customer may have access to the Citrix Cloud portal, which is a management and control portal for administrators. By registering components and services, an administrator and/or a customer may enable session launch telemetry to the analytics service. For example, centrally owned or managed services and customer owned or managed components and services can enable event telemetry to the event receiver endpoint hosted by the analytics service. In some examples, creating 502 and/or registering a key pair may only need to occur once per tenant, or only occasionally, whereas other operations of process 402 may occur each time a session launch is logged.

Next, the analytics service can send 504 an authentication token to the client application or tenant. In some examples, the authentication token may be valid for a limited time interval (e.g., several minutes, several hours, or a day), and may specify the tenant context. Upon receiving the event receiver information and the authentication token, each component for service may commence sending events from the session launch sequence to the event receiver.

Next, the analytics service can receive 506 a request from the client application or tenant. The request may include the events as well as the authentication token. In some examples, the events may be separated into multiple transmissions, and are not limited by the present disclosure. For example, each event may be transmitted separately, or any other number of events may be combined in a single respective transmission. Each transmission that includes at least one event should also include the authentication token, so that the tenant's context can be determined for the included events. The authentication token can provide the customer's context, and can help the analytics service validate, process, and store events.

In some examples, the event receiver receives the events. In some examples, the event receiver may also establish authenticity of the request (as in operation 508 below), and can determine the customer context from the authentication token. Moreover, the event receiver can process the received events accordingly.

Next, the analytics service can establish 508 authenticity of the request based on the authentication token for logging. For example, the event receiver can establish authenticity of the request and determine customer context based on the authentication token. The authentication token may remain valid for a preset time period. In some examples, the authentication token can be refreshed periodically to ensure the events can be continuously authenticated without interruption due to the token's expiration. Having authenticated the request, the event receiver may then process the events accordingly.

Next, the transaction and/or the analytics service consumes 510 the received events from the event receiver, batches the events using the transaction ID, and stores them in a transaction store. For example, the transaction store may be local to the cloud service and/or workspace server, or be located in a remote server, on the Internet, etc. In some examples, operation 510 may be performed by the transaction processor. The transaction processor may employ one or more methods, or a combination of methods, to determine which received events to associate to a given transaction. For example, each event may include a transaction ID, which may uniquely identify an end user request for a resource launch. Accordingly, the transaction processor may determine that events having the same transaction ID belong to the same transaction.

In some examples, certain events may not have a transaction ID because the prior component in the session launch sequence is not registered. In this case, the transaction processor may make use of additional correlational information, like the session key or resource ID, along with the event timestamps to correlate the events. In various examples, the transaction processor may additionally use a fixed or a sliding time window to wait for events in a particular transaction to arrive, thereby alleviating time skew issues in a distributed system.

After the transaction processor has batched and/or stored the events, the insight service can process all the events in a given transaction. For example, the insight service can process the events as described in FIGS. 2A-2B above and FIG. 6 below, to determine whether a session launch failed, which operation in the session launch sequence failed, and/or which component caused the failure. The insight service can store these insights for a transaction in another insights store. The system may subsequently use the insights to generate analysis and visualizations, aiding real-time forensic investigations or historical analysis.

The process 402 may then end.

Figure 6:
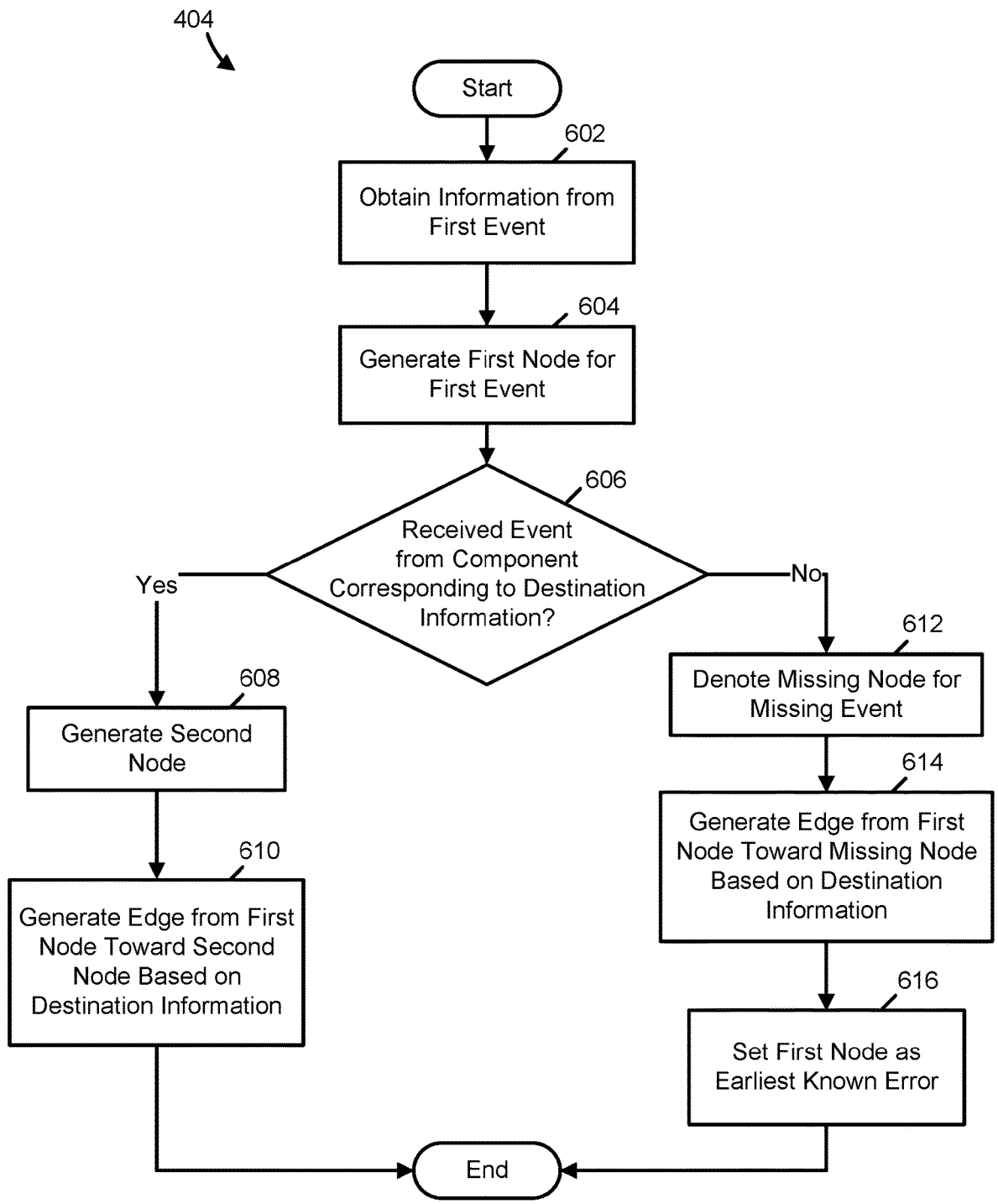
FIG. 6 is a flow diagram of a process for building a DAG representing a session launch, in accordance with an example of the present disclosure.

FIG. 6 is a flow diagram of a process 404 for building a DAG representing a session launch, in accordance with an example of the present disclosure. In this example, the process 404 may provide additional details of step 404 of the process 400 for identifying errors in a session launch in FIG. 4. In various examples, the process 404 may be implemented by an analytics service, such as the analytics service 102 of the example of FIG. 1 above, and/or by the insights service 112, or any other services or devices described herein. These services may execute within a cloud service, as in the example of FIG. 1 above, for example they may be executed by a workspace server. Alternatively or additionally, the process 404 may be executed by a client device, or may be implemented within a virtualization infrastructure, as described in the example of FIG. 9 below, and is not limited by the present disclosure.

As shown in FIG. 6, the process to build a session launch DAG starts with the insights service and/or analytics service obtaining 602 information from a first event among a plurality of events received from a client or tenant, as in FIGS. 4 and 5 above. For example, the information may include destination information, which may specify a destination component (e.g., a destination application or device) of a call within the session launch associated with the first event.

Next, the insights service and/or analytics service can generate 604 a first node of the DAG representing the first event. In various examples, the DAG may be represented in memory and/or in storage by various data structures (for example various types of linked lists, trees, or the like), and is not limited by the present disclosure.

Next, the insights service and/or analytics service can determine 606 whether the system has received an event associated with a component (e.g., an application or device) corresponding to the destination component specified in the destination information of the first event. In an example, under usual circumstances, the system should receive an event corresponding to each component and/or operation in the session launch sequence. However, in some cases, some events may be missing. For example, a component may be unable to send an event because it fails during the session launch, or because it is not registered.

If the system has received an event associated with the destination component specified in the destination information, the insights service and/or analytics service can then generate 608 a second node of the DAG representing the second event.

Next, the insights service and/or analytics service can assign 610 an edge from the first node directed toward the second node. In an example, the system directs the edge from the first node to the second node based on the destination information.

In some examples, the system may further build the primary DAG based on the timestamps of the API calls represented by the events. However, if a conflict occurs between the timestamps and the destination information, the system may assign greater priority to the destination information. For example, if component A calls component B, which in turn calls component C, but the timestamp of component B's call is earlier than the timestamp of component A's call, the system may determine that the timestamp information is erroneous. Because each component call has an unambiguous ordering from the calling component to the called component, in practice the system can generally build a DAG based on the destination information of the calls.

The generated edge may be directed from the first node to the second node, such that the resulting DAG may be unidirectional. In addition, the generated DAG may be acyclic, such that no directed path leads from any node back to the same node. As a result, when the session launch DAG is successfully built, the system can locate the first terminating error by traversing the DAG, since the DAG may reduce or eliminate ambiguity about calling precedence among the events.

If no event associated with the destination component specified in the destination information has been received, the insights service and/or analytics service can then optionally denote 612 a missing node for the missing event. For example, in a data structure representing the DAG, the system may denote 612 the missing node as a special type of node, as a node with a special characteristic denoting it as a missing node, as missing data, or in some other way.

Next, the insights service and/or analytics service can optionally assign 614 a missing edge from the first node directed toward the missing node. In various examples, the system directs the edge from the first node to the missing node based on the destination information of the first event, based on timestamp information, or based on any other information. In a data structure representing the DAG, the system can denote this missing edge specially, e.g. as an edge with a special characteristic denoting it as a missing edge, as missing data, or in some other way.

Next, the insights service and/or analytics service can optionally set 616 the first node as the earliest known error. For example, an event corresponding to the destination component may be missing because the failure occurred, so that the component was unable to send the event. In such a case, if no nodes prior to the first node are associated with the same error (e.g., having the same error identifier), or with any error, then the system may determine that the first node is the first terminating error. For example, even though one or more events may be missing, the system may still use the DAG to locate the first terminating error with satisfactory accuracy.

In some examples, the system may repeat these steps until all the received events have been represented as nodes in the DAG, and/or until the DAG has been completed. The DAG that includes the first operation of the client application or tenant that triggers the session launch may be considered a primary DAG, e.g. the primary DAG representing the session launch sequence. In some examples, the system may also build a secondary DAG for each asynchronous operation of the client application or tenant, as in the example of FIG. 2B. For example, the system may generate an edge directed from the node of the primary DAG that triggers the asynchronous operation to the first node of the secondary DAG. Moreover, the system may consider a subsequent event that requires a previously-triggered asynchronous operation to complete as an event that continues the primary session launch sequence DAG. For example, the system may generate an edge directed from some node of the secondary DAG, such as the last node of the secondary DAG, to the node of the primary DAG that is dependent on the asynchronous operation. In some examples, the system may also build higher-order DAGs, such as tertiary DAGs, etc.

The process 404 may then end.

Figure 7:
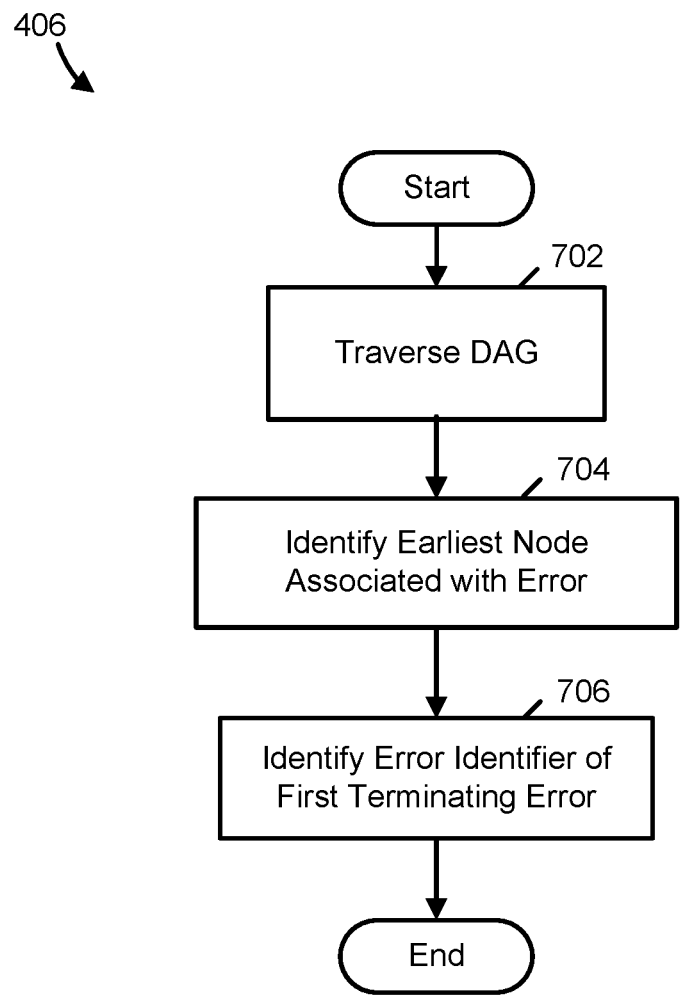
FIG. 7 is a flow diagram of a process for identifying errors within a DAG representing a session launch, in accordance with an example of the present disclosure.

FIG. 7 is a flow diagram of a process 406 for identifying errors within a DAG representing a session launch, in accordance with an example of the present disclosure. In this example, the process 406 may provide additional details of step 406 of the process 400 for identifying errors in a session launch in FIG. 4. In various examples, the process 406 may be implemented by an analytics service, such as the analytics service 102 of the example of FIG. 1 above, and/or by the query service 114, the event receiver 108, the transaction processor 110, and the insights service 112. These services may execute within a cloud service, as in the example of FIG. 1 above, for example they may be executed by a workspace server. Alternatively or additionally, the process 406 may be executed by a client device, or may be implemented within a virtualization infrastructure, as described in the example of FIG. 9 below, and is not limited by the present disclosure.

As shown in FIG. 7, the process to identify errors within a session launch DAG starts with the analytics service traversing 702 the primary DAG. For example, the analytics service may begin traversing 702 from the first node in the DAG. Because the DAG is unidirectional, the analytics service may traverse the DAG along the forward direction of the DAG's edges.

For example, the analytics service can traverse the primary DAG and/or any additional DAGs, such as secondary DAGs. Alternatively or additionally, the system may traverse the DAG in reverse order, for example starting from a node with a terminating failure or error, such as a node associated with a component unable to complete its operation, and traversing back to locate the node corresponding to the first terminating error.

Next, the analytics service can identify 704 the earliest node of the DAG associated with an error. For example, the analytics service may traverse 702 the DAG, starting from the first node of the primary DAG, and continuing until it locates an error. In an example, the analytics service may also traverse 702 any secondary or higher-order DAGs until it locates the first error. In some examples, having successfully built the DAG can enable the system to locate the earliest node associated with an error.

In some examples, the system may ignore errors that lack certain characteristics being sought, and may continue traversing the DAG until it locates the earliest error having those characteristics. For example, if the analytics service is seeking an error that caused a system launch failure, it may ignore errors that are too minor to have caused the failure. In some examples, the analytics service may subsequently identify the earliest node associated with an error capable of causing a system launch failure as the first terminating error, for example when determining the error identifier of the first terminating error in operation 706 below.

In cases where the system traverses the DAG in reverse order, the analytics service may continue to traverse in reverse order until it reaches the earliest node associated with an error. In some examples, the analytics service may identify an earlier node that is not associated with the same (e.g., does not have the same error identifier) or with any error, and may therefore determine that a subsequent node is the earliest associated with the error. For example, the system may bound the location of the earliest node associated with an error using a binary search heuristic, and/or may directly observe a particular node is the first to be associated with the error identifier.

In some examples, the analytics service can traverse the primary DAG and/or any additional DAGs, such as secondary DAGs. For example, the analytics service may determine that an asynchronous operation is related to the error, for example by using binary search to narrow the error's location. The analytics service may then traverse one or more additional DAGs, such as secondary or tertiary DAGs, in order to continue to search for the first terminating error.

Next, the analytics service can identify 706 the error identifier of the first terminating error. For example, the analytics service can determine the error identifier of the node identified in operation 704, and can identify this error identifier as the first terminating error. In some examples, the error identifier may be a code, a string, or some other descriptor representing the error. In some examples, the analytics service can determine the error identifier from events associated with one or more nodes encountered while traversing the DAG. The process 406 may then end.

Figure 8A:
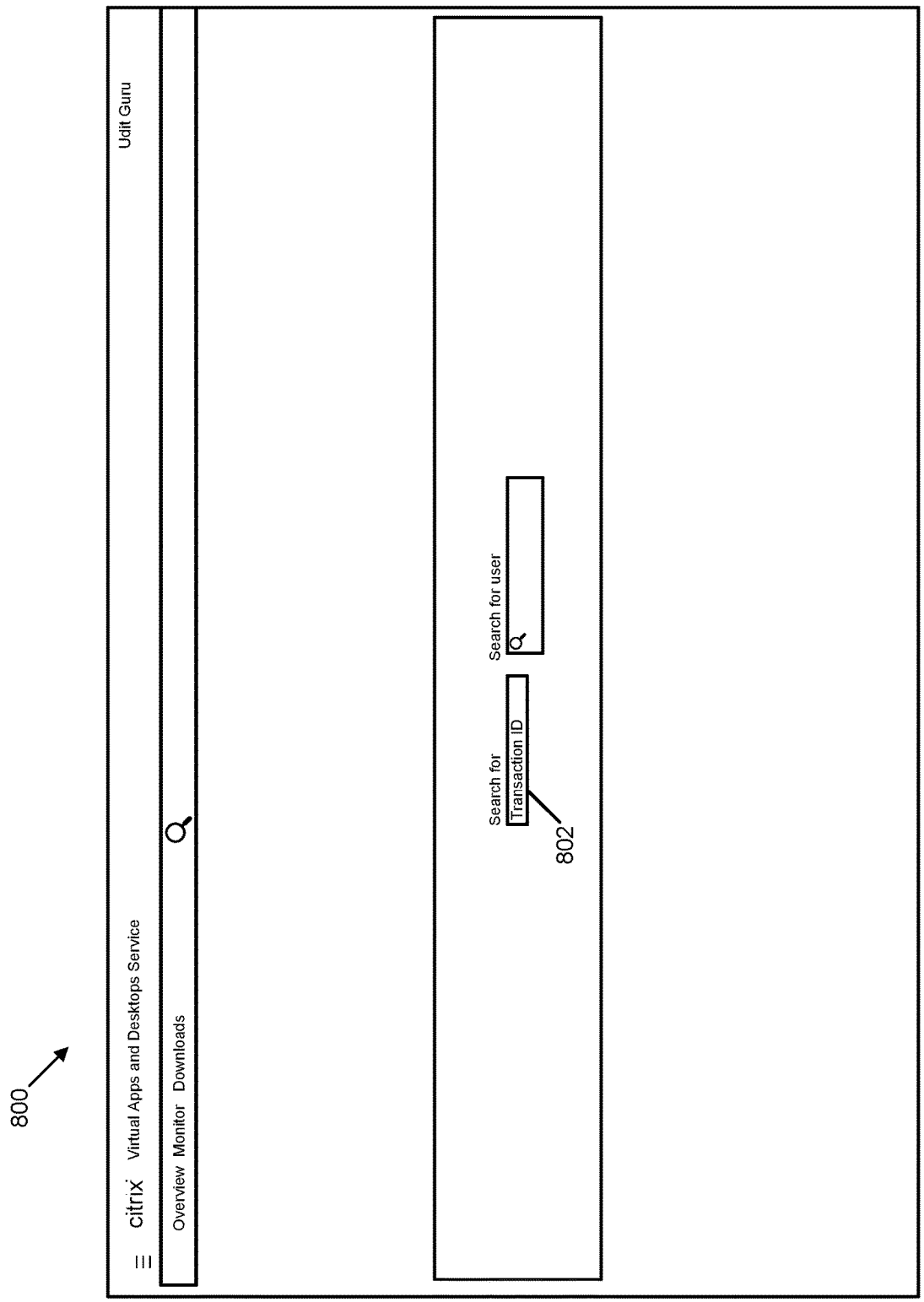
FIG. 8A illustrates a user interface to search for a transaction within a Director console for analysis and troubleshooting, in accordance with an example of the present disclosure.

FIG. 8A illustrates a user interface to search for a transaction within a Director console 800 for analysis and troubleshooting, in accordance with an example of the present disclosure. For example, if an end user experiences a session launch failure, the workspace application (e.g., the digital workspace 116 of FIG. 1) can provide a transaction ID associated with the session launch sequence, or a relevant part thereof, to the user. The user may then refer the transaction ID to a helpdesk administrator for troubleshooting the issue, in order to determine why the session launch request failed. In another example, the workspace application can share an error identifier based on traversing the DAG, as in FIG. 7 above.

Helpdesk administrators can share and collaborate on multiple session launch cases using the respective transaction IDs. For example, administrators can view and download event traces and/or DAGs for analysis via APIs or the Director console 800. Likewise, a customer may engage offsite product support for the virtual applications and desktops service by referring to the transaction ID, thereby alleviating challenges due to insufficient logs, issue reproduction, and the like.

As shown in this example, the system can receive a request for information from a user or administrator based on a transaction ID, and can retrieve insights for a transaction based on the transaction ID from an insights store, library, or database. In this example, the user may select the transaction ID as the search method from a control 802 in the user interface of the Director console 800. In some examples, if the user or administrator searches based on the transaction ID, the system can locate historical information relating to a failure for that transaction ID (such as a DAG, an error identifier for a first terminating error, and the like). The system can subsequently use the historical information, such as an error identifier, to provide troubleshooting information and recommendations related to the failure, as in the example of FIG. 8B below. For example, the system can retrieve recommended actions based on the error identifier associated with the searched transaction ID.

Alternatively or additionally, the user may select some other search method from the control 802, and the system can search based on the selected method. For example, the insights store, library, or database may be indexed to the error identifier as a lookup key for specific troubleshooting recommendations, and the user may accordingly select the error identifier as the search method from the control 802. For example, the system may report the error identifier to the user or administrator, and the user or administrator may search for information or recommendations based on the error identifier. In some examples, the user can select another search method from the control 802, such as by username, IP address, failure date or time, or the like, and the user can then search based on the selected search method.

In some examples, a query service (e.g., the query service 114 of FIG. 1) may implement the Director console 800 and/or may retrieve the information and recommendations from the insights store, library, or database. For example, in response to a helpdesk administrator's query, the query service may look up the transaction ID and serve a transaction details page to the administrator via the Director console 800. The transaction details page can describe the transaction and provide insights on the failure and recommendations to address the issue, as described in FIG. 8B.

Figure 8B:
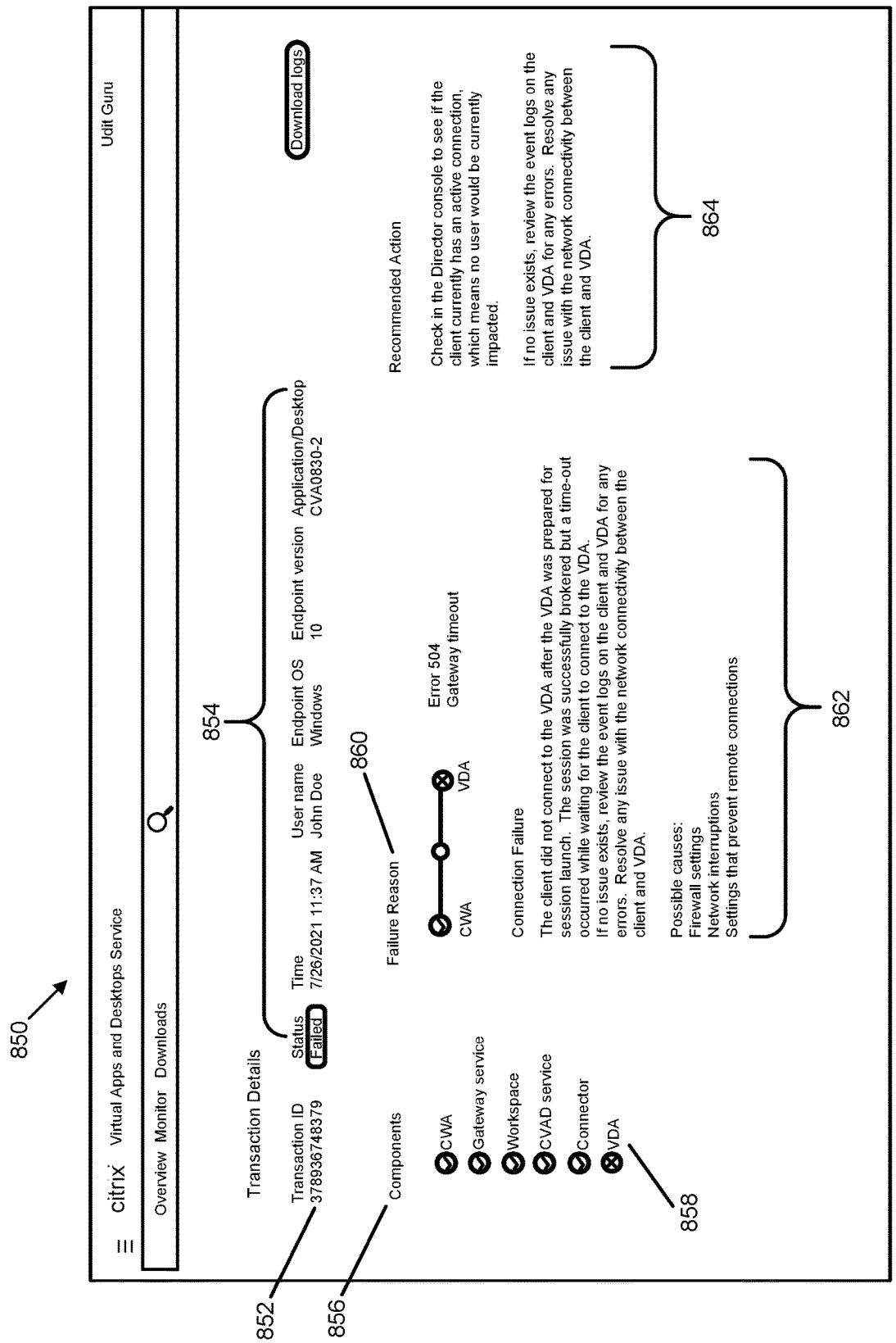
FIG. 8B illustrates a user interface to visualize transaction details within a Director console for analysis and troubleshooting, in accordance with an example of the present disclosure.

FIG. 8B illustrates a user interface to visualize transaction details within a Director console 850 for analysis and troubleshooting, in accordance with an example of the present disclosure. After looking up an administrator's query (e.g., based on the transaction ID 852), the query service can serve the transaction details via the Director console 850. The transaction details may be displayed via a user interface, as shown, or as a page or website, such as HTML, CSS, and the like, or via a web or software-as-a-service application.

In this example, the Director console 850 displays the searched transaction ID 852 and details 854 of the corresponding transaction. The console 850 also displays the status 856 of various components that took part in the session launch. In this example, the status indicators 856 show that the VDA 858 has failed, whereas other components functioned normally. This status information 856 may be based on traversal of the primary and/or secondary session launch DAGs, as described in FIGS. 4 and 7 above.

The console 850 can provide additional assessments of the session launch failure, including a brief description 860 of the reason for failure, as well as details and possible causes of the failure 862. In this example, the brief description 860 of the reason for failure provides low-level detail of the proximate cause of failure, such as a "Gateway timeout." The details and possible causes of failure 862 provides a more detailed description of the proximate cause of failure, such as "a time out occurred while waiting for the client to connect to the VDA," and also provides troubleshooting tips. The details and possible causes of failure 862 can also include possible underlying causes of the error, such as "Firewall settings," "Network interruptions," and "Settings that prevent remote connections" in this example. In some examples, the brief description 860 of the reason for failure and/or the possible causes of failure 862 can be based on error codes previously identified during traversal of the session launch DAG, as in FIGS. 4 and 7 above. For example, the query service may invoke an API to fetch relevant explanatory and/or troubleshooting information based on the error codes. In an example, administrators may view such reports via the Director console 850 or analytics service, and determine which components or factors are most detrimental to session launches in their virtual applications and desktops environment.

Finally, the console 850 can display recommended actions 864. In this example, the recommended actions 864 include to check "if the client currently has an active connection," "review the event logs on the client and VDA for any errors," and "Resolve any issue with the network connectivity between the client and VDA." Likewise, for the example DAGs illustrated in FIG. 2B above, the recommendations may include to look at the health of the connector and ensure connectivity with the hypervisor, or to check the hypervisor logs to determine if a power operation was executed against a specific VDA. In an example, the recommended actions 864 may also be based on an API call and/or lookup of an error identifier, as described in FIG. 7 above.

Computer System Configured to Generate a User Contact Profile

Figure 9:
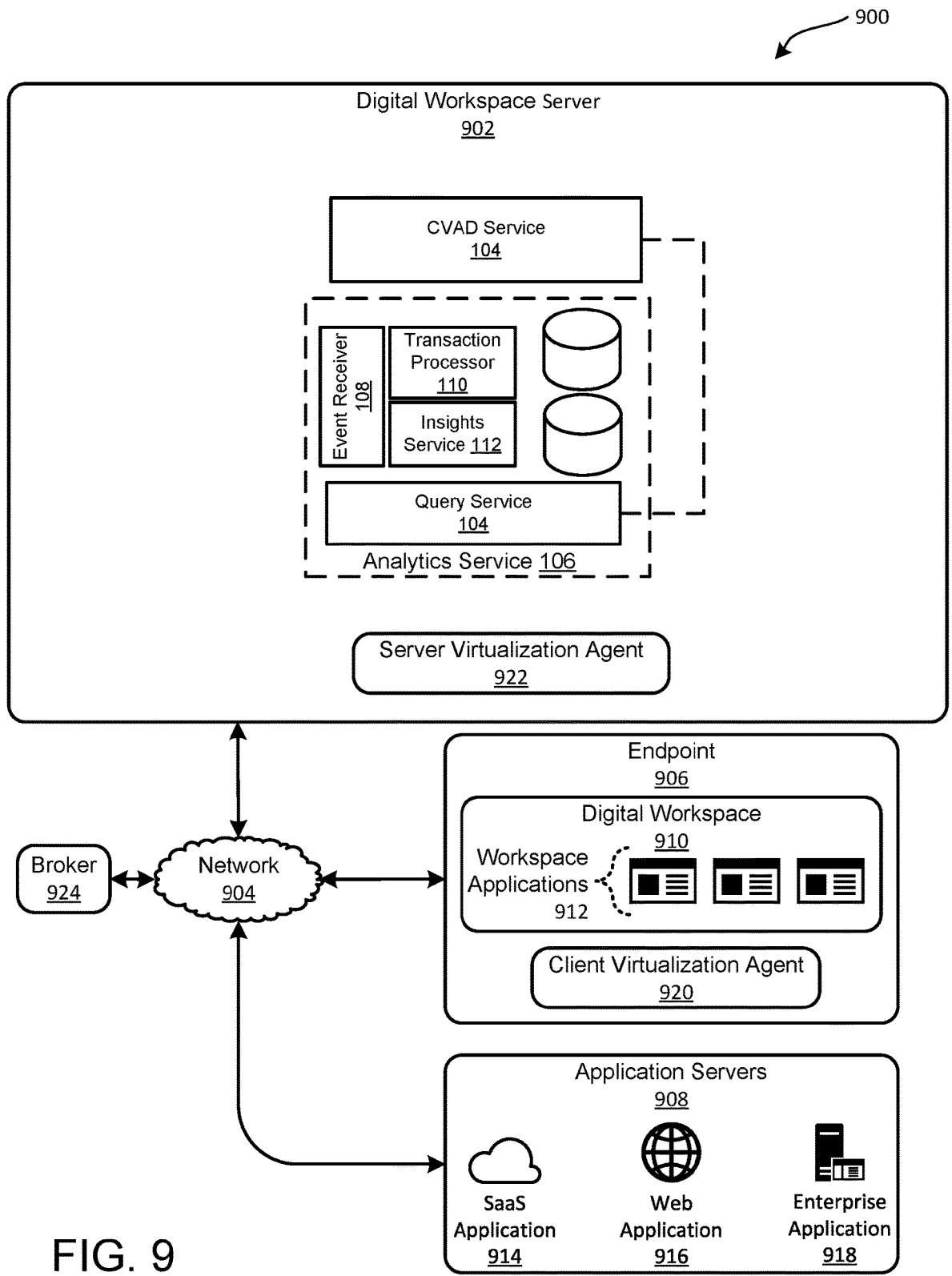
FIG. 9 is a block diagram of an example system for identifying errors in a session launch, in accordance with an example of the present disclosure.

FIG. 9 is a block diagram of an example system 900 for identifying errors in a session launch initiated by a client application, in accordance with an example of the present disclosure. The system 900 includes a digital workspace server 902 that is capable of analyzing how a user, associated with an endpoint 906, interacts with applications provided by one or more application servers 908. The user's association with the endpoint 906 may exist by virtue of, for example, the user being logged into or authenticated to the endpoint 906. While only one endpoint 906 and three example application servers 908 are illustrated in FIG. 9 for clarity, it will be appreciated that, in general, the system 900 is capable of analyzing interactions between an arbitrary number of endpoints and an arbitrary number of application servers. The digital workspace server 902, the endpoint 906, and the application servers 908 communicate with each other via a network 904. The network 904 may be a public network (such as the Internet) or a private network (such as a corporate intranet or other network with restricted access). Other examples may have fewer or more communication paths, networks, subcomponents, and/or resources depending on the granularity of a particular implementation. For example, in some implementations at least a portion of the application functionality is provided by one or more applications hosted locally at an endpoint. Thus references to the application servers 908 should be understood as encompassing applications that are locally hosted at one or more endpoints. It should therefore be appreciated that the examples described and illustrated herein are not intended to be limited to the provision or exclusion of any particular services and/or resources.

The digital workspace server 902 is configured to host the CVAD service 104, the analytics service 102 (which may include the query service 114, the event receiver 108, the transaction processor 110, and the insights service 112), and the server virtualization agent 922. The digital workspace server 902 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain examples. As illustrated in FIG. 9, the digital workspace server 902 includes one or more software programs configured to implement certain of the functionalities disclosed herein as well as hardware capable of enabling such implementation.

As noted above, in certain examples the endpoint 906 can be a computing device that is used by the user. Examples of such a computing device include but are not limited to, a desktop computer, a laptop computer, a tablet computer, and a smartphone. The digital workspace server 902 and its components are configured to interact with a plurality of endpoints. In an example, the user interacts with a plurality of workspace applications 912 that are accessible through a digital workspace 910, which can serve as a workspace client application discussed above. The user's interactions with the workspace applications 912 and/or the application servers 908 may be tracked, monitored, and analyzed by the workspace service 310. Any microapps can be made available to the user through the digital workspace 910, thereby allowing the user to view information and perform actions without launching (or switching context to) the underlying workspace applications 912. The workspace applications 912 can be provided by the application servers 908 and/or can be provided locally at the endpoint 906. For instance, the example workspace applications 912 include a SaaS application 914, a web application 916, and an enterprise application 918, although any other suitable exiting or subsequently developed applications can be used as well, including proprietary applications and desktop applications. To enable the endpoint 906 to participate in a virtualization infrastructure facilitated by the broker computer 924 and involving the server virtualization agent 922 as discussed herein, the endpoint 906 also hosts the client virtualization agent 920.

The broker computer 924 is configured to act as an intermediary between the client virtualization agent 920 and the server virtualization agent 922 within the virtualization infrastructure. In some examples, the broker computer 924 registers virtual resources offered by server virtualization agents, such as the server virtualization agent 922. In these examples, the broker computer 924 is also configured to receive requests for virtual resources from client virtualization agents, such as the client virtualization agent 920, and to establish virtual computing sessions involving the client virtualization agent 920 and the server virtualization agent 922.

Computing Device

Figure 10:
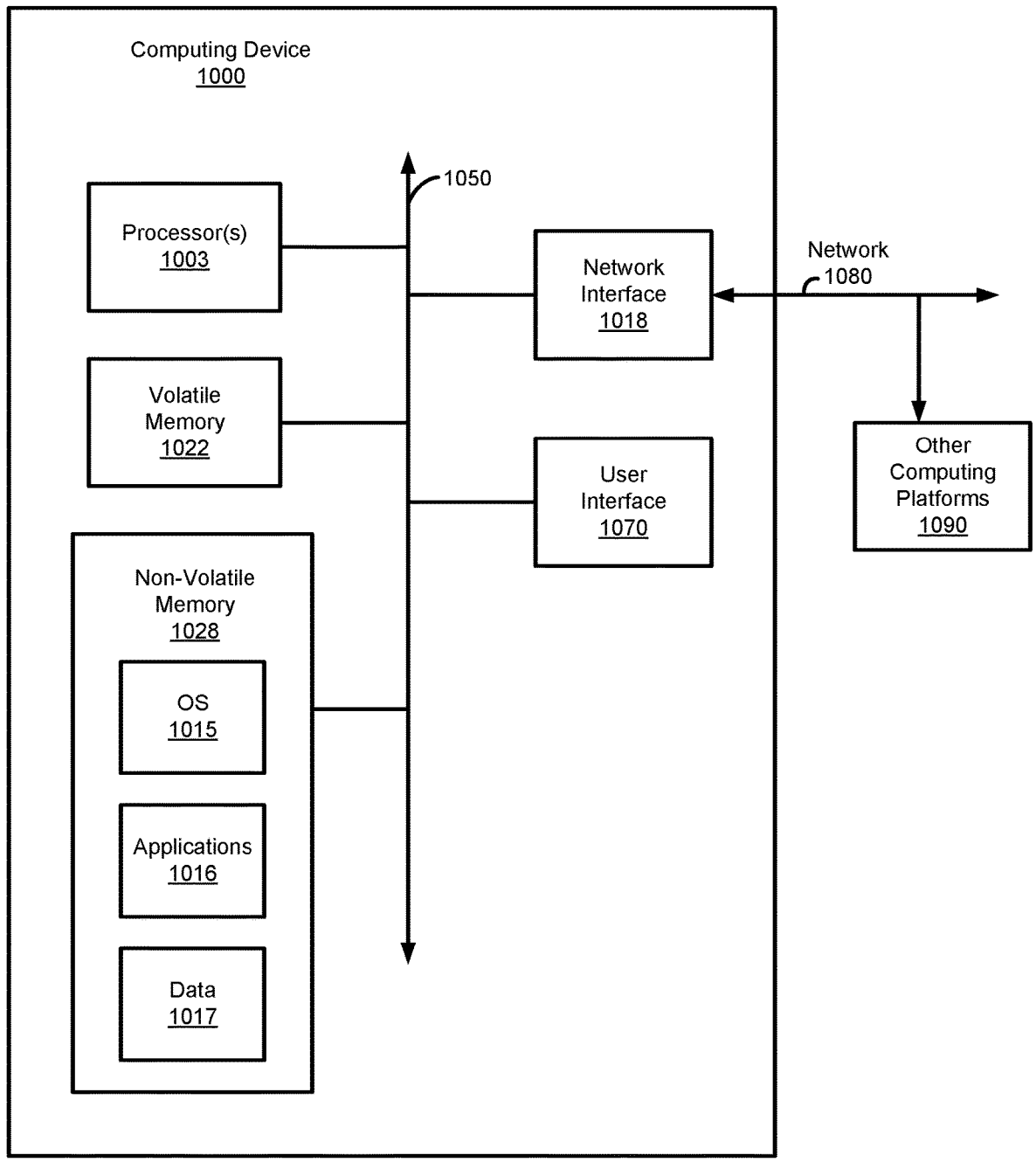
FIG. 10 is a block diagram of a computing device configured to implement various systems and processes in accordance with examples disclosed herein.

FIG. 10 is a block diagram of a computing device configured to implement various systems and processes in accordance with examples disclosed herein.

The computing device 1000 includes one or more processor(s) 1003, volatile memory 1022 (e.g., random access memory (RAM)), non-volatile memory 1028, a user interface (UI) 1070, one or more network or communication interfaces 1018, and a communications bus 1050. The computing device 1000 may also be referred to as a client device, computing device, endpoint device, computer, or a computer system.

The non-volatile (non-transitory) memory 1028 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1070 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 1028 stores an OS 1015, one or more applications or programs 1016, and data 1017. The OS 1015 and the application 1016 include sequences of instructions that are encoded for execution by processor(s) 1003. Execution of these instructions results in manipulated data. Prior to their execution, the instructions can be copied to the volatile memory 1022. In some examples, the volatile memory 1022 can include one or more types of RAM and/or a cache memory that can offer a faster response time than a main memory. Data can be entered through the user interface 1070 or received from the other I/O device(s), such as the network interface 1018. The various elements of the device 1000 described above can communicate with one another via the communications bus 1050.

The illustrated computing device 1000 is shown merely as an example client device or server and can be implemented within any computing or processing environment with any type of physical or virtual machine or set of physical and virtual machines that can have suitable hardware and/or software capable of operating as described herein.

The processor(s) 1003 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 1003 can be analog, digital or mixed. In some examples, the processor(s) 1003 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 1018 can include one or more interfaces to enable the computing device 1000 to access a computer network 1080 such as a Local Area Network (LAN), a Wide Area Network (WAN), a Personal Area Network (PAN), or the Internet through a variety of wired and/or wireless connections, including cellular connections and Bluetooth connections. In some examples, the network 1080 may allow for communication with other computing devices 1090, to enable distributed computing. The network 1080 can include, for example, one or more private and/or public networks over which computing devices can exchange data.

In described examples, the computing device 1000 can execute an application on behalf of a user of a client device. For example, the computing device 1000 can execute one or more virtual machines managed by a hypervisor. Each virtual machine can provide an execution session within which applications execute on behalf of a user or a client device, such as a hosted desktop session. The computing device 1000 can also execute a terminal services session to provide a hosted desktop environment. The computing device 1000 can provide access to a remote computing environment including one or more applications, one or more desktop applications, and one or more desktop sessions in which one or more applications can execute.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A server computer system configured to identify errors in a session launch involving one or more components of a datacenter, wherein the session launch is initiated by a client application of a client endpoint device, the server computer system comprising:
   a memory; and
   at least one processor coupled to the memory and configured to execute an analytics service to:
      receive one or more events from one or more applications or devices involved in the session launch, wherein an event of the one or more events comprises information from one or more of an application or device call communicated during the session launch, the information specifying one or more of a destination application or device;
      build a primary Directed Acyclic Graph (DAG) based on the information from the one or more of the application or device call;
      determine an error identifier based on the primary DAG;
      retrieve a troubleshooting recommendation from a library based on the error identifier; and
      send the troubleshooting recommendation to one or more of the client application or an administrator application.

2. The server computer system of claim 1, wherein:
   the client application executes under a first tenant context of a plurality of tenant contexts; and
   to receive the one or more events comprises
      to send an authentication token to the client application,
      to receive a request comprising the one or more events and the authentication token from the client application, and
      to establish authenticity of the request based on the authentication token.

3. The server computer system of claim 2, wherein the authentication token:
   is valid for a limited time interval; and
   specifies the first tenant context.

4. The server computer system of claim 1, wherein:
   the event further comprises a timestamp of the one or more of the application or device call, an event identifier, and a result code; and
   to build the primary DAG is further based on the timestamp of the one or more of the application or device call.

5. The server computer system of claim 1, wherein the primary DAG comprises a node representing the event.

6. The server computer system of claim 5, wherein to build the primary DAG comprises to assign an edge from the node directed toward a second node based on the one or more of the destination application or device, wherein the one or more of the destination application or device is associated with the second node.

7. The server computer system of claim 1, wherein to determine the error identifier further comprises to identify an earliest terminating error based on a traversal of the primary DAG.

8. The server computer system of claim 7, wherein to identify the earliest terminating error comprises to identify an earliest node of the primary DAG associated with an error.

9. The server computer system of claim 1, wherein:
   the session launch is triggered by a first operation of the client application;
   the at least one processor is further configured to build a secondary DAG for a second operation of the client application; and
   the second operation is asynchronous to the first operation.

10. The server computer system of claim 1, wherein to determine the error identifier comprises:
    to consume, via an event processing routine, one or more transactions associated with a tenant context; and
    to determine that an application configuration, a device configuration, or an operation has impacted the session launch.

11. The server computer system of claim 10, wherein to consume the one or more transactions further comprises to correlate events corresponding to a respective transaction based on one or more of:
    a respective transaction identifier;
    a respective session key; or
    a respective resource identifier.

12. A method of identifying errors in a session launch involving one or more components of a datacenter, wherein the session launch is initiated by a client application of a client endpoint device, the method executed by an analytics service of a server and comprising:
    receiving one or more events from one or more applications or devices involved in the session launch, wherein an event of the one or more events comprises information from one or more of an application or device call communicated during the session launch, the information specifying one or more of a destination application or device;
building a primary Directed Acyclic Graph (DAG) based on the information from the one or more of the application or device call;
determining an error identifier based on the primary DAG;
retrieving a troubleshooting recommendation from a library based on the error identifier; and
sending the troubleshooting recommendation to one or more of the client application or an administrator application.

13. The method of claim 12, wherein:
the client application executes under a first tenant context of a plurality of tenant contexts; and
receiving the one or more events comprises:
sending an authentication token to the client application;
receiving a request comprising the one or more events and the authentication token from the client application; and
establishing authenticity of the request based on the authentication token.

14. The method of claim 13, wherein the authentication token:
is valid for a limited time interval; and
specifies the first tenant context.

15. The method of claim 12, wherein:
building the primary DAG comprises assigning an edge from a node representing the event and directed toward a second node;
assigning the edge is based on the one or more of the destination application or device; and
the one or more of the destination application or device is associated with the second node.

16. The method of claim 12, wherein determining the error identifier further comprises identifying an earliest terminating error based on traversing the primary DAG.

17. The method of claim 12:
wherein the session launch is triggered by a first operation of the client application;
further comprising building a secondary DAG for a second operation of the client application; and
wherein the second operation is asynchronous to the first operation.

18. A non-transitory computer readable medium storing executable sequences of instructions to identify errors in a session launch involving one or more components of a datacenter, wherein the session launch is initiated by a client application of a client endpoint device, the sequences of instructions comprising instructions to execute an analytics service to:
receive one or more events from one or more applications or devices involved in the session launch, wherein an event of the one or more events comprises information from one or more of an application or device call communicated during the session launch, the information specifying one or more of a destination application or device;
build a primary Directed Acyclic Graph (DAG) based on the information from the one or more of the application or device call;
determine an error identifier based on the primary DAG;
retrieve a troubleshooting recommendation from a library based on the error identifier; and
send the troubleshooting recommendation to one or more of the client application or an administrator application.

19. The non-transitory computer readable medium of claim 18, wherein:
the client application executes under a first tenant context of a plurality of tenant contexts; and
to receive the one or more events comprises
to send an authentication token to the client application, wherein the authentication token:
is valid for a limited time interval; and
specifies the first tenant context;
to receive a request comprising the one or more events and the authentication token from the client application; and
to establish authenticity of the request based on the authentication token.

20. The non-transitory computer readable medium of claim 18, wherein to determine the error identifier further comprises to identify an earliest terminating error based on a traversal of the primary DAG.

* * * * *